United States Patent [19]

Catlin et al.

[11] Patent Number: 5,179,713

[45] Date of Patent: Jan. 12, 1993

[54] APPARATUS FOR ALLOWING EXTERNAL CONTROL OF LOCAL BUS READ USING ZERO WAIT STATS INPUT OF COMBINED I/O AND DRAM CONTROLLER

[75] Inventors: Robert W. Catlin, Santa Clara; Robert M. Pleva, Livermore; Frank Spahn, El Cerrito, all of Calif.

[73] Assignee: Chips and Technologies, Inc., San Jose, Calif.

[21] Appl. No.: 533,977

[22] Filed: Jun. 6, 1990

Related U.S. Application Data

[63] Continuation-in-part of Ser. No. 435,853, Nov. 13, 1989.

[51] Int. Cl.⁵ ............................................. G06F 13/00
[52] U.S. Cl. ................................. 395/800; 364/927.8; 364/232.8
[58] Field of Search ............. 395/800, 325, 425, 725; 364/DIG. 1, DIG. II

[56] References Cited

U.S. PATENT DOCUMENTS 4,228,520 10/1980 Letteney .......................... 364/760
4,466,055 8/1984 Kinoshita ........................ 364/200
4,721,868 1/1988 Cornell .......................... 307/465
4,991,085 2/1991 Pleva ............................ 364/200

Primary Examiner—David Y. Eng
Attorney, Agent, or Firm—Townsend and Townsend

[57] ABSTRACT

A single semiconductor chip containing both I/O bus controller and DRAM controller functions. A single pin on the chip is used to provide both a zero wait state input to the I/O bus controller and to provide a local bus access (LBA) signal for inhibiting both the I/O bus controller and the DRAM controller when an external device is doing an I/O or memory operation on the local bus. Logic is provided to produce an inhibit signal to the I/O bus controller in response to the LBA signal. Another logic circuit is provided to inhibit the DRAM controller in response to the LBA signal only when there is a memory cycle signal from the microprocessor. The use of the single pin is possible since the zero wait state isgnal will only appear during the latter part of an I/O or memory cycle, which is mutually exclusive with the start of an I/O or memory cycle, which is the only time the LBA signal will appear.

5 Claims, 2 Drawing Sheets

APPARATUS FOR ALLOWING EXTERNAL CONTROL OF LOCAL BUS READ USING ZERO WAIT STATS INPUT OF COMBINED I/O AND DRAM CONTROLLER

This application is a continuation-in-part of application Ser. No. 07/435,853, filed Nov. 13, 1989.

BACKGROUND

The present invention relates to system logic semiconductor chips for providing external support circuitry to implement a computer system with a microprocessor.

A microprocessor-based computer system would typically have a microprocessor directly coupled to a local bus, with dynamic random access memory (DRAM) coupled to the local bus. The control of memory read and write cycles to the DRAM is typically controlled by an external DRAM controller chip coupled to the local bus which provides the necessary timing and refresh signals for the DRAM, and decodes addresses to provide chip select signals to the appropriate bank of DRAM. One such DRAM controller is part no. 82C212, available from Chips and Technologies, Inc. in San Jose, Calif.

An I/O bus controller is typically coupled to the local bus for providing access to peripheral devices and add-on memory through a system bus, such as the IBM AT bus. The microprocessor is only coupled to the AT bus through the I/O bus controller.

A typical I/O bus controller will generate I/O bus cycle timing signals for every read and write cycle on the assumption that the device being read or written to is on the AT bus. The DRAM controller will determine whether a read or write cycle is for the local DRAM, and, if so, will produce an inhibit signal to the I/O bus controller and will provide its own timing signals on the local bus.

The I/O bus controller produces cycles which take much longer than the DRAM controller. A peripheral device which can operate faster than the normal I/O cycle can produce a zero wait state signal to the I/O bus controller indicating that the I/O cycles can be terminated early.

It is a continuing objective in the semiconductor industry to place more and more functions on a single chip to bring down the costs of personal computers. One of the limitations on such an effort in circuits with multiple buses such as discussed above is the limited number of input and output pins to a semiconductor chip. The packaging required for a chip with a very large number of pins becomes very expensive, and offsets the reduction in costs achieved through the use of a single chip.

SUMMARY OF THE INVENTION

The present invention provides a single semiconductor chip containing both I/O bus controller and DRAM controller functions. A single pin on the chip is used to provide both a zero wait state input to the I/O bus controller and to provide a local bus access (LBA) signal for inhibiting both the I/O bus controller and the DRAM controller when an external device is doing an I/O or memory operation on the local bus. Logic is provided to produce an inhibit signal to the I/O bus controller in response to the LBA signal. Another logic circuit is provided to inhibit the DRAM controller in response to the LBA signal only when there is a memory cycle signal from the microprocessor. The use of the single pin is possible since the zero wait state signal will only appear during the latter part of an I/O or memory cycle, which is mutually exclusive with the start of an I/O or memory cycle, which is the only time the LBA signal will appear.

The present invention is thus able to provide two functions through a single pin by virtue of the use of some additional logic circuitry and the choice of two functions which occur at mutually exclusive times. This provides for a reduction in the number of pins and aids in the ability to produce a single support chip for providing substantially all the external logic needed to support a microprocessor in a personal computer system.

In one embodiment, the local bus access signal can be produced by a static random access memory (SRAM) cache controller coupled to the local bus. The cache controller would provide the LBA signal when there is a cache hit, indicating that the data to be read is indeed stored in the SRAM cache. The cache hit determination could be done quickly, and the LBA signal would prevent the DRAM controller and the I/O bus controller from taking any action.

Optionally, the DRAM controller may also produce a ready signal to the microprocessor in response to the LBA signal, indicating completion of the read operation. Thus, the SRAM cache controller need not include logic for generating the ready signal, thus making it simpler to implement. Since the LBA signal would not be generated for a cache miss, a DRAM access will not be inhibited, which is exactly what is desired in the event of an SRAM cache miss, since the data would then be in DRAM.

In another embodiment, the local bus I/O cycle is used by a math coprocessor, which produces the LBA signal.

For a fuller understanding of the nature and advantages of the invention, reference should be made to the ensuing detailed description taken in conjunction with the accompanying drawings.

DETAILED DESCRIPTION OF THE PREFERRED EMBODIMENT

Figure 1:
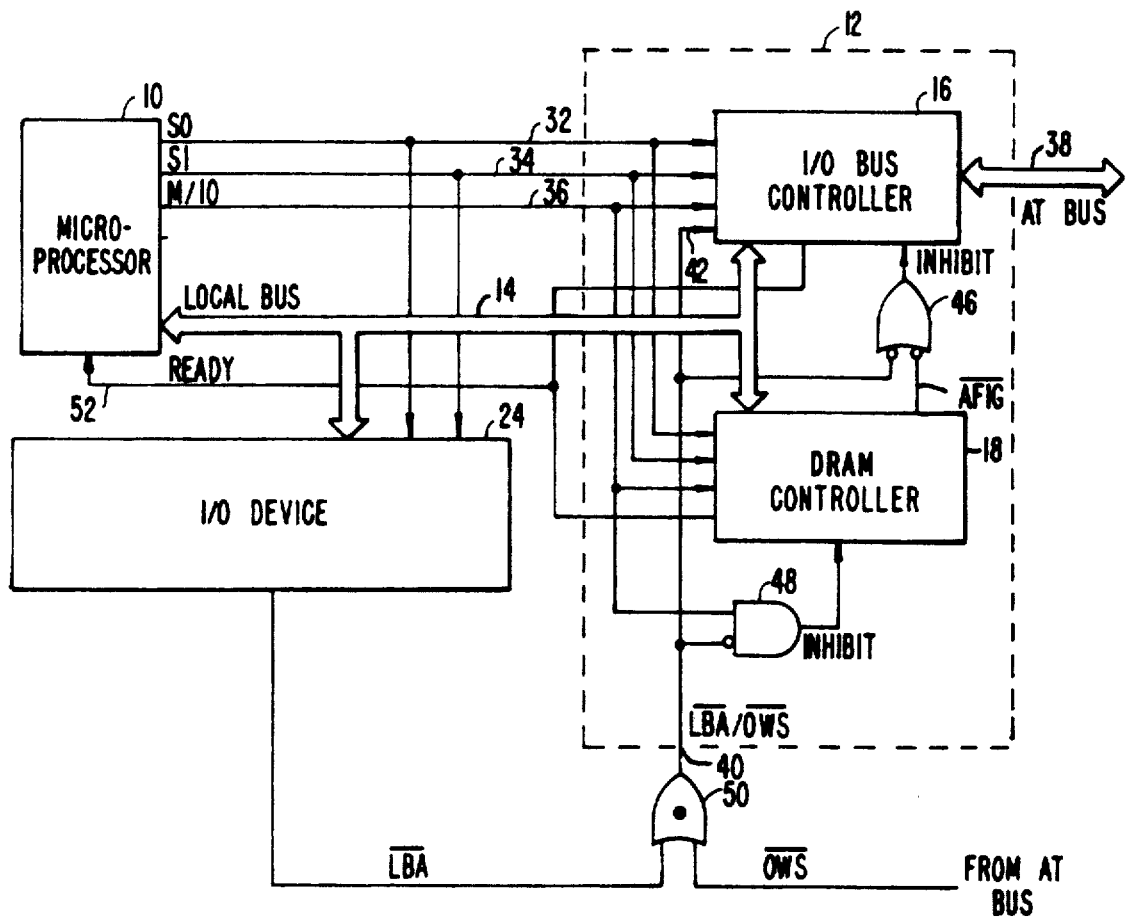
FIG. 1 shows a block diagram of a preferred embodiment of the present invention.

FIG. 1 shows a microprocessor 10 coupled to a semiconductor chip 12 according to the present invention over a local bus 14. Semiconductor chip 12 includes an I/O bus controller 16 and a DRAM controller 18. These signals in the local bus 14 are coupled to a local bus I/O device 24. Device 24 could be a memory, a coprocessor, or any other I/O device.

A portion of the control signals between microprocessor 10 and chip 12 are shown. In particular, the status signals for the Intel 80286 microprocessor are shown. These are the S0 (line 32) and S1 (line 34) signals which are coded to indicate read and write cycles. The M/$\overline{IO}$ signal on line 36 indicates a memory cycle on the local bus in one state, and an I/O cycle in the other state. All three of these signals are provided to the I/O bus controller 16 and the DRAM controller 18. Different control signals would be used for the Intel 80386 or other microprocessors. The AT bus 38 is coupled to the I/O bus controller 16. The only path for data to the AT bus is through I/O bus controller 16, while the addresses are separately, externally latched to the AT bus.

A LBA/0WS (local bus access/zero wait state) input pin 40 is coupled to a zero wait state input 42 of I/O bus controller 16. This same pin is also connected as an input to OR gate 46. This produces an inhibit signal to I/O bus controller 16 through OR gate 46. The inputs of OR gate 46 are inverted. Although LBA and 0WS share the same line, they occur at different times. The inhibit input of I/O bus controller 16 only accepts an inhibit signal in the first half of a cycle. The zero wait state signal will thus not produce an inhibit signal since it occurs during the second half of a cycle.

Figure 2:
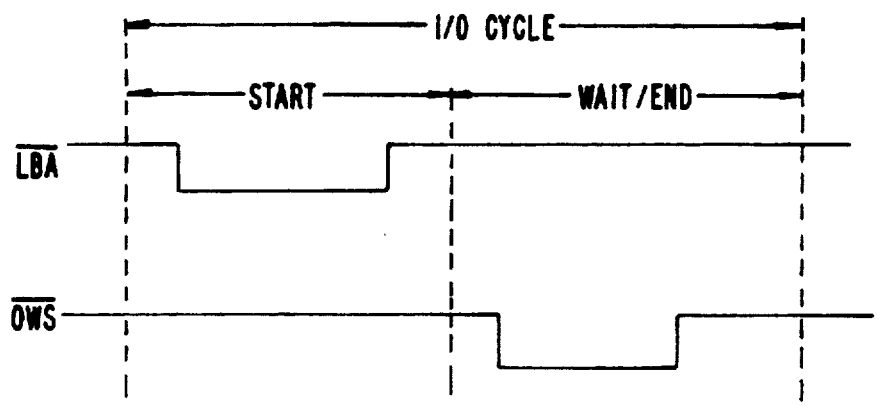
FIG. 2 is a timing diagram showing the LBA and OWS signals.

FIG. 2 shows the I/O cycle timing. An I/O cycle has a first, start period and a second, wait/end period. The start period is used to supply signals to the I/O device, and the wait/end period is when the I/O device responds (in the case of a read). The LBA signals will always occur during the start period, while the 0WS signals will always occur during the wait/end period. NOR gate 46 also produces an inhibit signal labeled AF16 from DRAM controller 18, which inhibits I/O bus controller 16 when DRAM controller 18 takes control of the cycle.

A separate AND gate 48 is coupled to pin 40 and to M/IO status line 36. The pin 40 input is inverted. This will produce an inhibit signal to DRAM controller 18 when pin 40 is active and there is a memory cycle. The LBA signal indicates that some external device has taken control of the local bus for this memory operation, and thus the DRAM controller need not be concerned with it. The DRAM controller does not need to be inhibited for an I/O operation, since it only acts when it sees a memory cycle.

The LBA signal is provided to pin 40 through a wired OR 50, along with the zero wait state (0WS) signal from the AT bus. The wired OR 50 indicates an open collector line providing both the LBA and 0WS signals with a pull-up resistor somewhere on the line connected to input pin 40.

Figure 3:
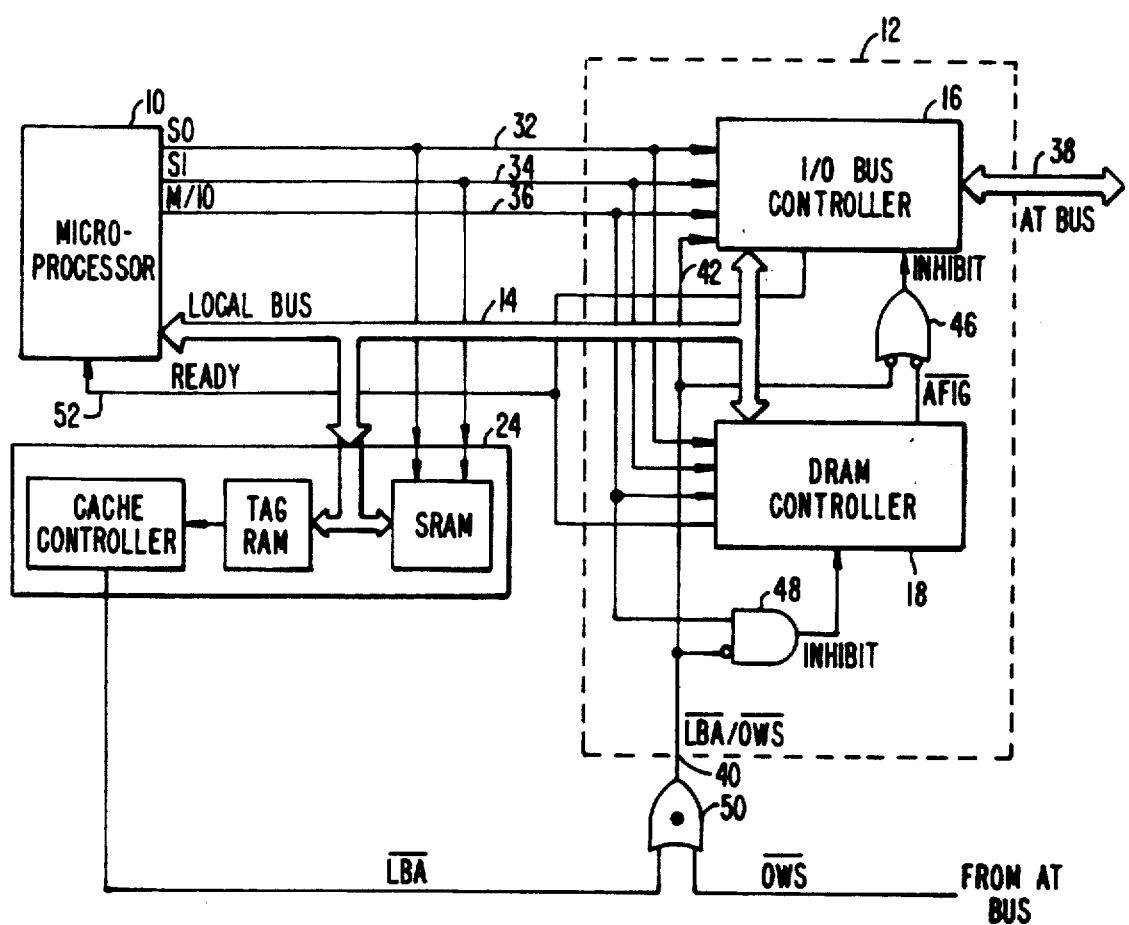
FIG. 3 is a block diagram of the embodiment of FIG. 1 used for a SRAM cache memory.

FIG. 3 shows an embodiment of the present invention for an SRAM cache as the I/O device. I/O device 24 includes an SRAM 26, a tag RAM 28 and a cache controller 30. Additional control lines 20 and 22 are shown for indicating the high or low portions of memory.

In the event of a cache hit, cache controller 30 will produce the LBA signal, indicating that it will produce the data from SRAM 26 to bus 14, and thus there is no need for DRAM controller 18 to intervene. In the event of a cache miss, the data is not in SRAM 26, and DRAM controller will need to access DRAM to retrieve the data. In this instance, the LBA was not generated, and DRAM controller 18 is not inhibited.

In the event of a cache hit, it is necessary for microprocessor 10 to receive a ready input on line 52 indicating that the data is ready to be read. This ready signal may optionally be produced by DRAM controller 18 when it receives the inhibit signal from NAND gate 48. DRAM controller 18 can be programmed to have this capability. Thus, cache controller 30 can be a simple programmable logic array (PLA) which need not include the logic necessary to generate the ready signal. The system may take advantage of the already existing capability of the DRAM controller to produce the ready signal.

As will be understood by those familiar with the art, the present invention may be embodied in other specific forms without departing from the spirit or essential characteristics thereof. For example, in the embodiment of FIG. 3, device 24 need not be an SRAM cache controller, but could, for example, be an interleaved memory controller. Also, instead of NAND gate 44, bus controller 16 could internally decide when to accept the LBA/0WS input as an inhibit, depending on the state of the status signals. Although an AT bus has been described, it could be any other system bus which has a line which may be shared on a time multiplexed basis. Accordingly, the disclosure of the preferred embodiment of the invention is intended to be illustrative, but not limiting, of the scope of the invention which is set forth in the following claims.

What is claimed is:

1. A semiconductor chip for providing support circuitry to facilitate the implementation of a computer system with a microprocessor, comprising:
   an I/O bus controller, having inputs for coupling to a local bus coupled to said microprocessor and outputs for coupling to a system bus not directly connected to said microprocessor, for providing I/O cycle timing signals to said outputs unless an inhibit signal is received on an inhibit input, and including a zero wait state input for receiving an external zero wait state signal indicating that said I/O cycle timing signals can be completed earlier;
   a DRAM controller, having inputs and outputs for coupling to said local bus, for providing memory cycle timing signals to said local bus;
   a zero wait state/local bus access input pin, coupled to said zero wait state input of said I/O bus controller, for providing a zero wait state/local bus access signal indicating the presence of either said external zero wait state signal or a local bus access signal from an external device doing an operation on said local bus;
   a memory/input-output pin for providing a memory/input-output signal from said microprocessor indicating a memory cycle in a first state and an I/O cycle in a second state;
   first logic means for inhibiting the provision of said I/O cycle timing signals by said I/O bus controller in response to the presence of said zero wait state/local bus access signal; and
   second logic means for inhibiting the provision of said memory cycle timing signals by said DRAM controller in response to the presence of said first state of said memory/input-output signal, and said zero wait state/local bus access signal.

2. The semiconductor chip of claim 1 wherein said first logic means comprises an OR gate having a first input coupled to said zero wait state/local bus access input, a second input coupled to an output of said DRAM controller and an output coupled to an inhibit input of said I/O bus controller.

3. The semiconductor chip of claim 1 wherein said second logic means comprises an AND gate.

4. The semiconductor chip of claim 1 further comprising an open collector line coupled to said zero wait state/local bus access input pin and a pull-up resistor coupled to said open collector line.

5. A semiconductor chip for providing support circuitry to facilitate the implementation of a computer system with a microprocessor, comprising:

- an I/O bus controller, having inputs for coupling to a local bus coupled to said microprocessor and outputs for coupling to a system bus not directly connected to said microprocessor, for providing I/O cycle timing signals to said outputs unless an inhibit signal is received on an inhibit input, and including a zero wait state input for receiving an external zero wait state signal indicating that said I/O cycle timing signals can be completed earlier;
- a DRAM controller, having inputs and outputs for coupling to said local bus, for providing memory cycle timing signals to said local bus;
- a zero wait state/local bus access input pin, coupled to said zero wait state input of said I/O bus controller, for providing a zero wait state/local bus access signal indicating the presence of either said external zero wait state signal or a local bus access signal from an external device doing an operation on said local bus;
- a memory/input-output pin for providing a memory/input-output signal from said microprocessor indicating a memory cycle in a first state and an I/O cycle in a second state;
- an OR logic gate for inhibiting the provision of said I/O cycle timing signals by said I/O bus controller in response to the presence of said zero wait state/local bus access signal or the control of a cycle by said DRAM controller, said OR logic gate having a first input coupled to said zero wait state/local bus access input pin, a second input coupled to an output of said DRAM controller, and an output coupled to an inhibit input of said I/O bus controller;
- an AND gate having an output coupled to an inhibit input of said DRAM controller, a first input coupled to said memory/input-output pin, and a second input coupled to said zero wait state/local bus access pin;
- an open collector line coupled to said zero wait state/local bus access input pin; and
- a pull-up resistor coupled to said open collector line.

* * * * *